Feb. 16, 1943. D. G. RENNO 2,311,129
VEHICLE BODY CONSTRUCTION
Filed Sept. 18, 1941 8 Sheets-Sheet 1

Inventor
D. G. Renno
By Paul O. Pippel
Atty.

Feb. 16, 1943.     D. G. RENNO     2,311,129
VEHICLE BODY CONSTRUCTION
Filed Sept. 18, 1941     8 Sheets-Sheet 2

Inventor
D. G. Renno
By Paul O Pippel
Atty

Feb. 16, 1943.  D. G. RENNO  2,311,129
VEHICLE BODY CONSTRUCTION
Filed Sept. 18, 1941  8 Sheets-Sheet 3
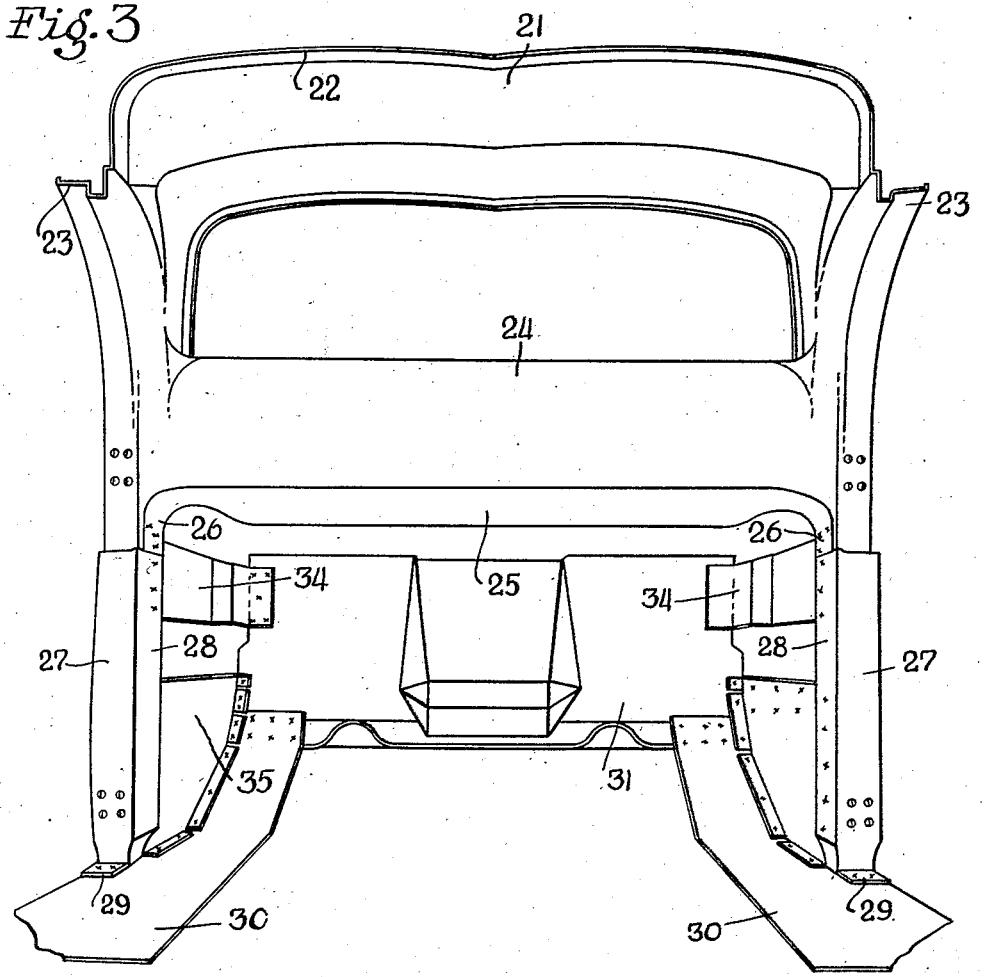
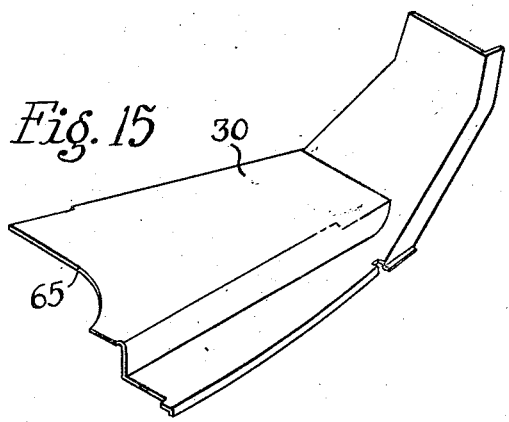
Inventor
D. G. Renno
By Paul O. Pippel
Atty.

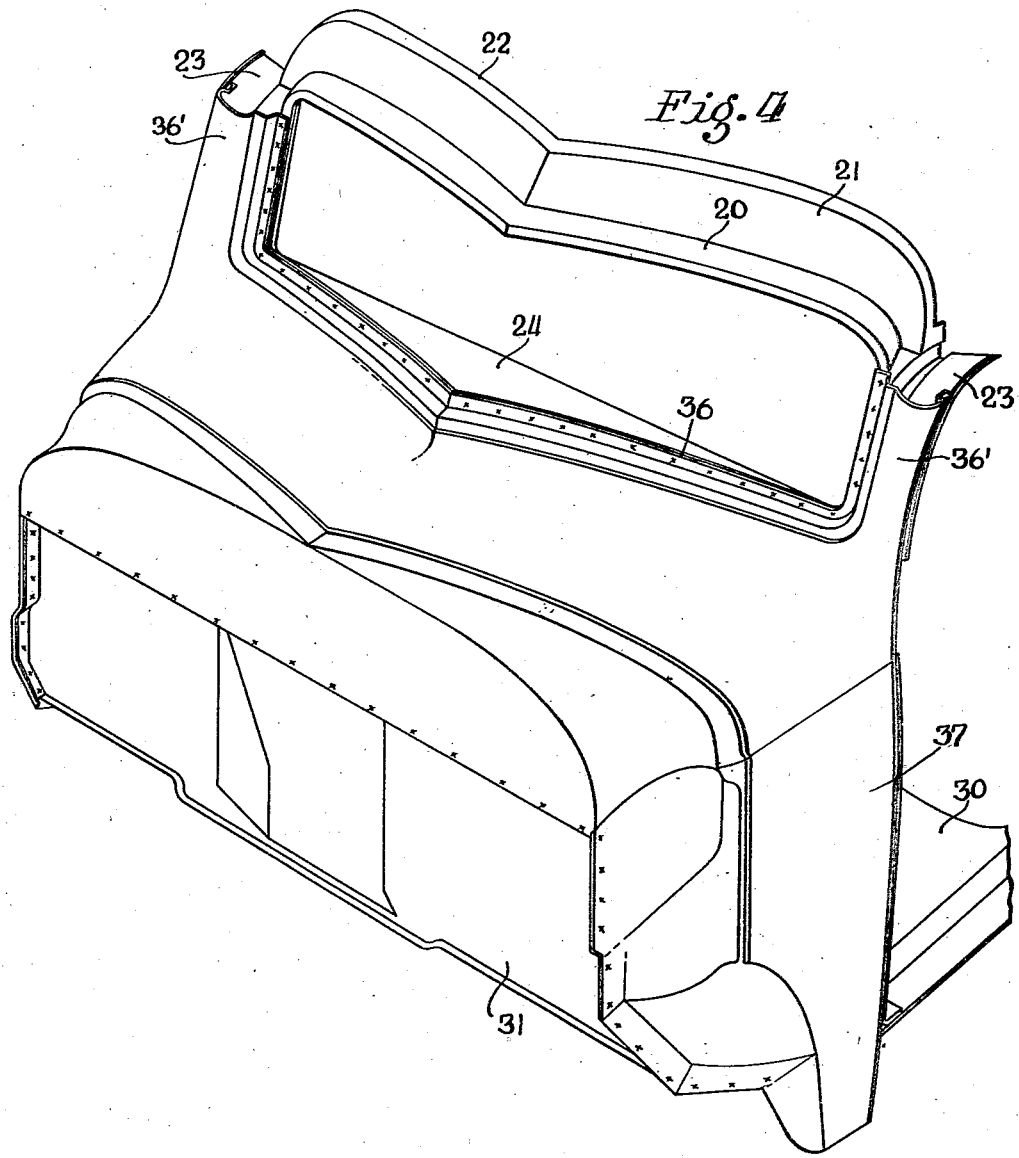

Feb. 16, 1943. D. G. RENNO 2,311,129
VEHICLE BODY CONSTRUCTION
Filed Sept. 18, 1941 8 Sheets-Sheet 5
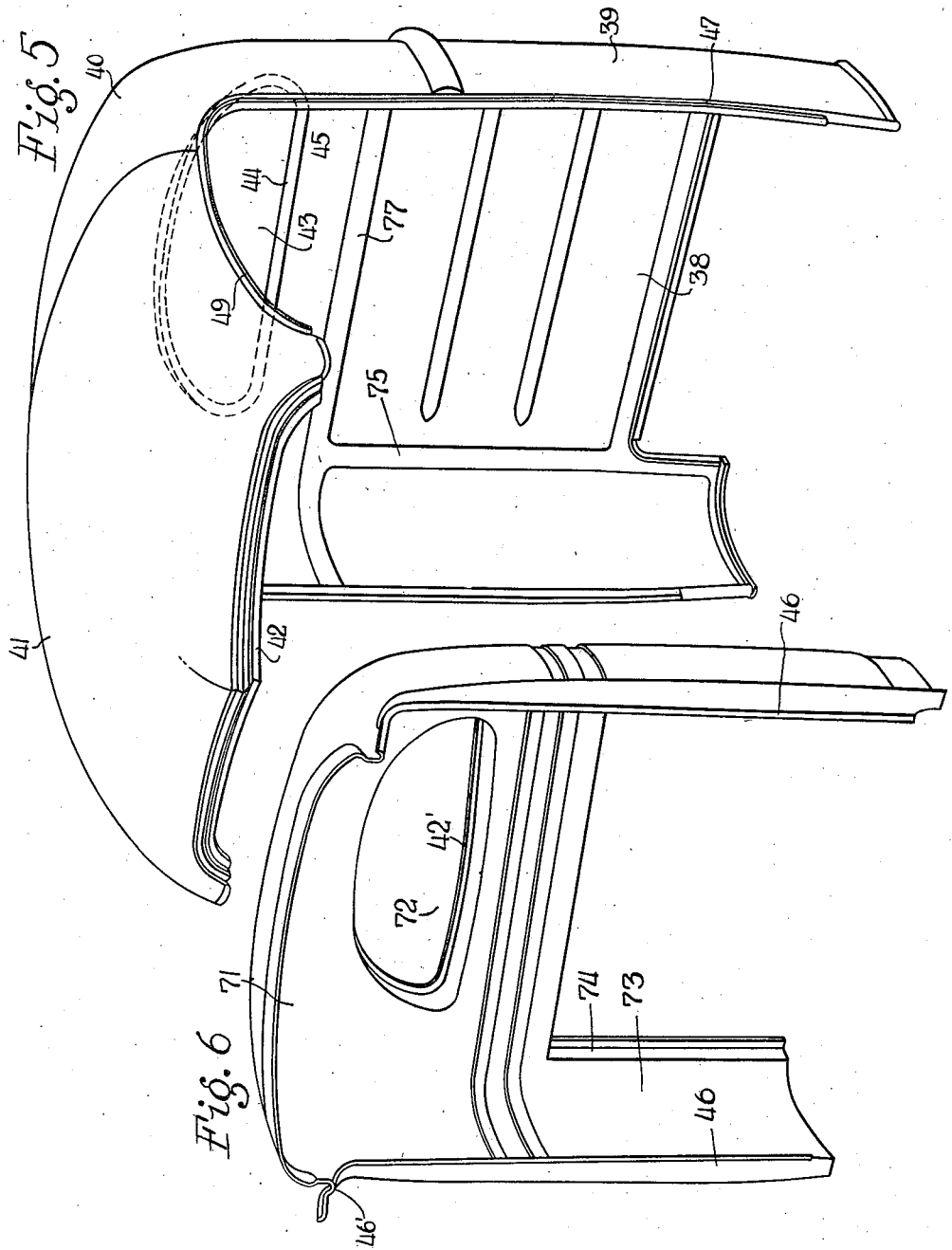
Inventor
D. G. Renno
By Paul O. Pippel
Atty.

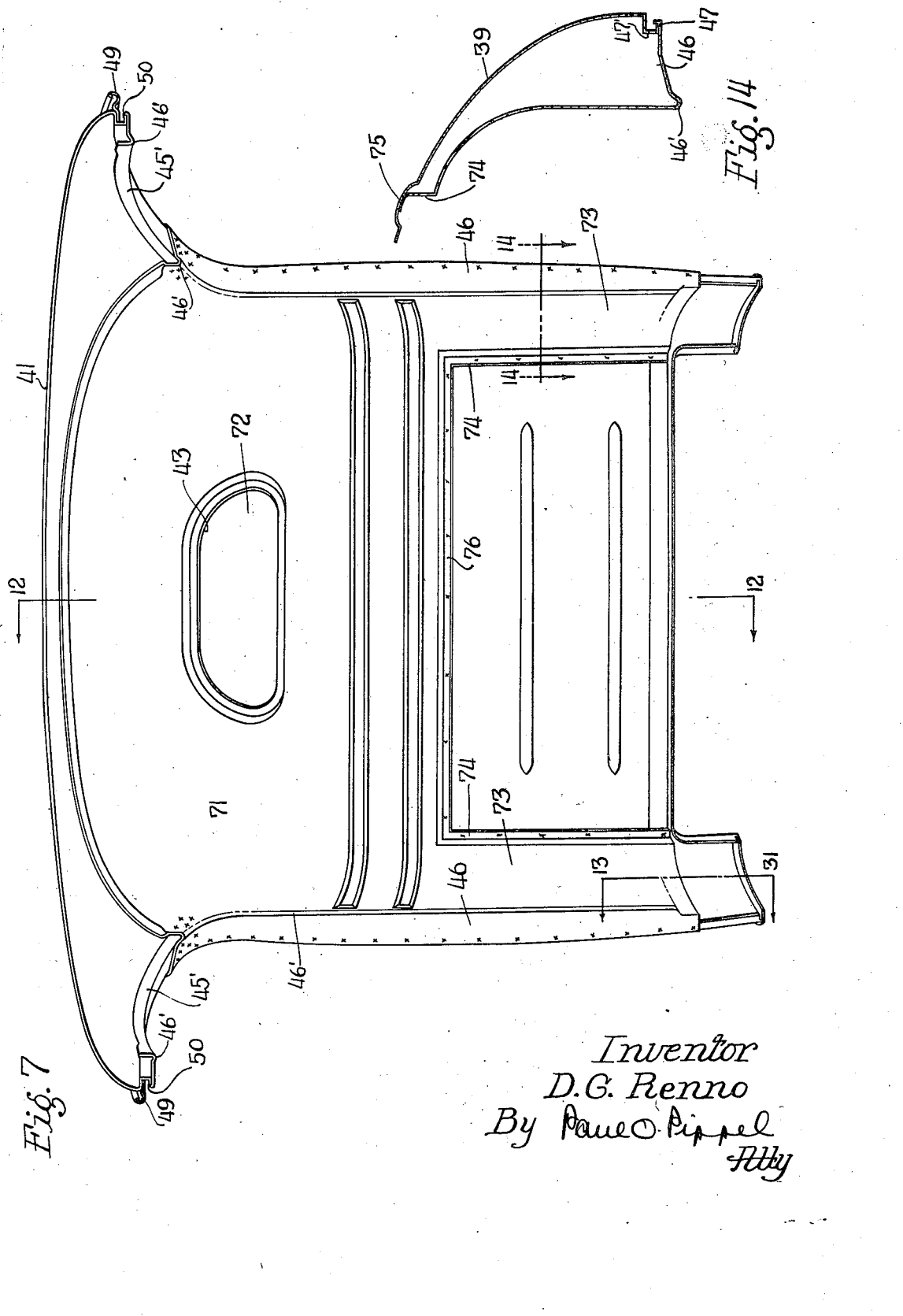

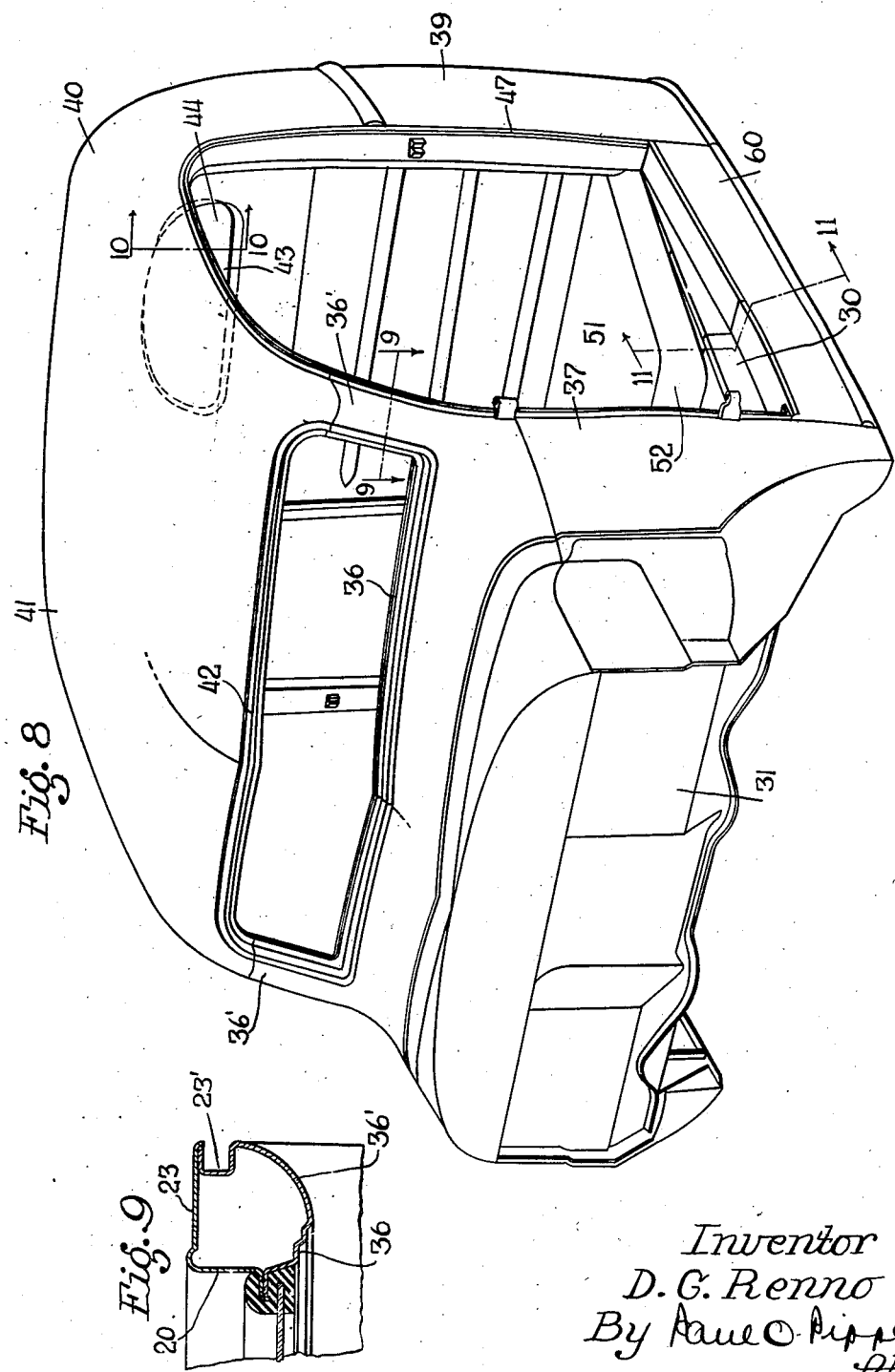

Feb. 16, 1943.　　　D. G. RENNO　　　2,311,129
VEHICLE BODY CONSTRUCTION
Filed Sept. 18, 1941　　8 Sheets-Sheet 8
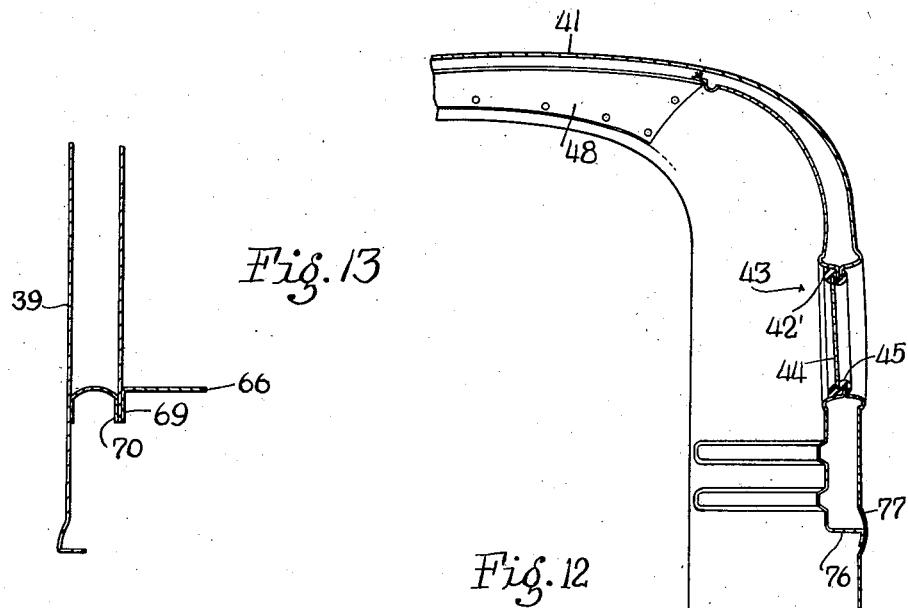
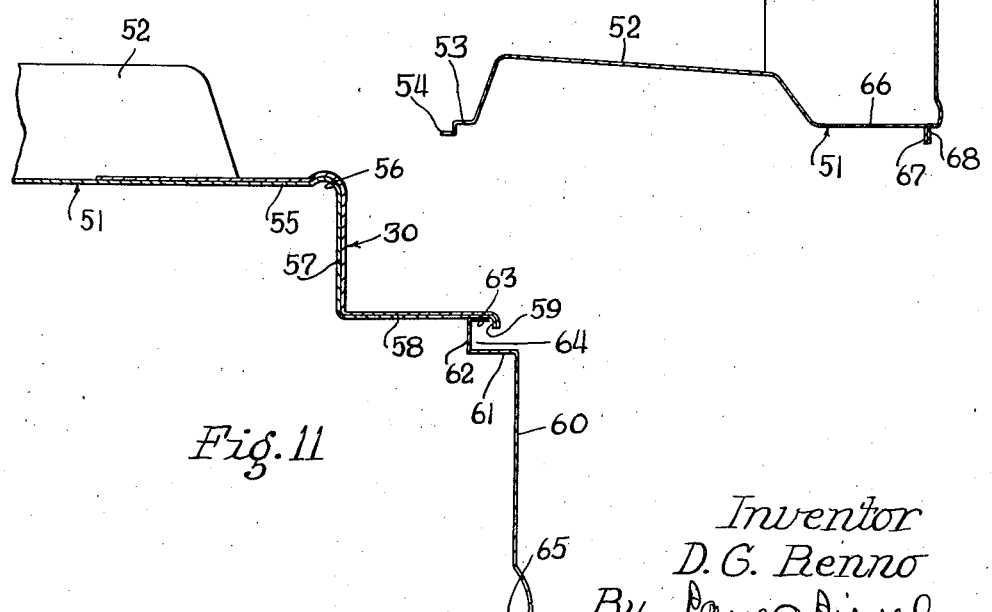
Inventor
D. G. Renno
By Paul O. Pippel
Atty.

Patented Feb. 16, 1943

2,311,129

UNITED STATES PATENT OFFICE 2,311,129

VEHICLE BODY CONSTRUCTION

Donald G. Renno, New Haven, Ind., assignor to International Harvester Company, a corporation of New Jersey Application September 18, 1941, Serial No. 411,272

13 Claims. (Cl. 296—28)

This invention relates to a steel body construction for automotive vehicles. More particularly, it relates to the formation of different units and the means by which they are assembled to form a unit body construction.

The principal object of the invention is to provide an improved cab construction with a minimum of sections, a minimum amount of material, and maximum strength.

Another object is to form sheet metal parts making up a steel body in such a manner that portions are joined to form reenforcements for door pillars and other openings; also, to provide the equivalent of sills for the body and supporting means for the seat of the vehicle.

These objects and others which will be apparent are obtained by providing sections and joining them in the manner illustrated in the accompanying drawings, in which:

Figure 3 is a perspective view from the rear of the same structure shown in Figure 2;

Figure 4 is a front three-quarter perspective view of the structure shown in Figure 2 with the outside cowl panel secured in position, as well as the front side panels;

Figure 5 is a perspective view of the rear body section and the top panel secured together, as indicated by the juncture line;

Figure 6 is a perspective view of the inside rear panel in the same position relative to Figure 5 as it occupies when fitted into position;

Figure 7 is a front view of the rear section of the body with the inner panel secured to the outer panel;

Figure 8 is a three-quarter perspective view of the entire assembled cab structure;

Figure 9 is a detailed section taken on the line 9—9 of Figure 8;

Figure 11 is a section taken on the line 11—11 of Figure 8;

Figure 12 is a longitudinal vertical section taken through the center of the cab, taken on the line 12—12 of Figure 7;

Figure 13 is a section taken on the line 13—13 of Figure 7;

Figure 14 is a section taken on the line 14—14 of Figure 7; and

Figure 15 is a perspective view of the front sill member shown in Figure 3.

Figure 1:
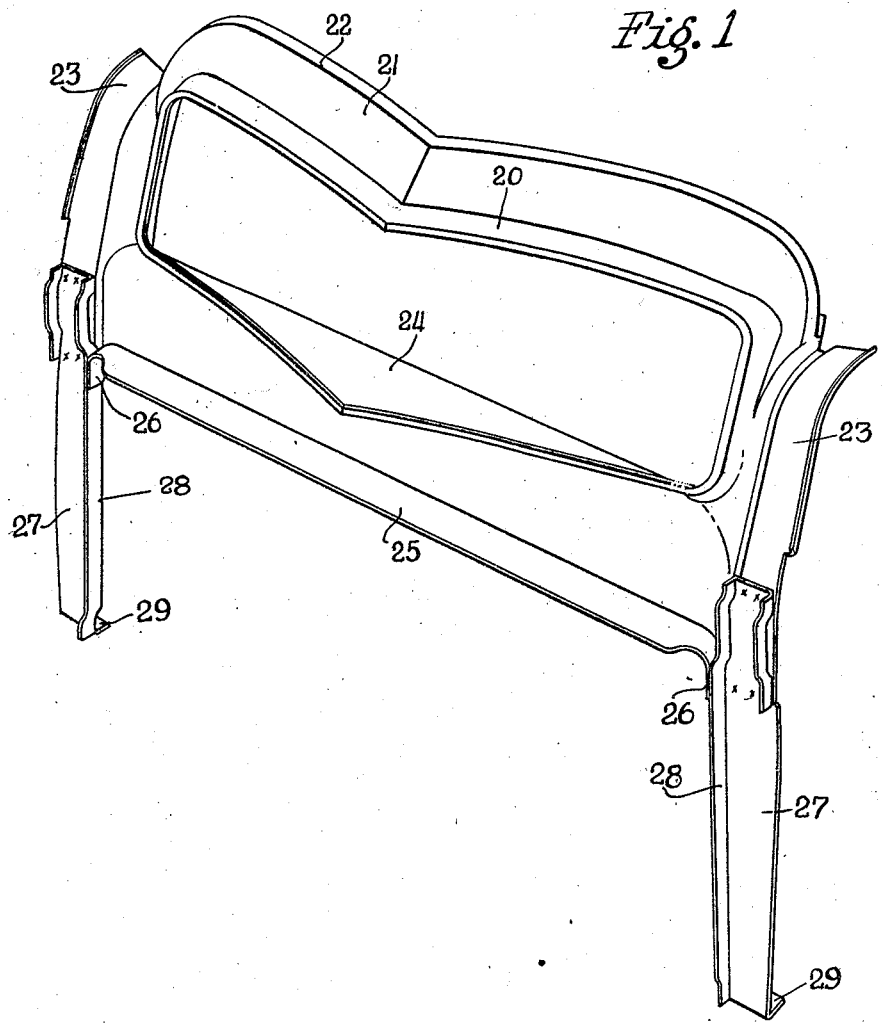
Figure 1 is a perspective view of the upper front panel which forms the windshield opening and the cowl, and the side members which form one part of the front pillars.

The body shown in the drawings is of the unit type constructed entirely of steel and welded together primarily by spot welding; although arc welding or acetylene welding may be applied at certain junctures of the contacting members to strengthen the joints. The panels are designed to form box-like sections at locations where strength is required. The body may be considered of the frameless type, since there is no separate frame and the body is self-supporting, in that the sheet metal members provide the entire framework and support.

Referring to Figure 1, the inner front panel is illustrated. This panel is provided with an out-turned flange 20 which provides the windshield opening. As this invention is concerned with a cab construction, the details of the windshield mounting have not been shown. An upwardly extending flange 21 above the top of the windshield opening is provided with a rearwardly turned flange 22 for connection with the top panel, to be later described. Along the sides or ends of the windshield opening, the inner front panel is formed with curved flange portions 23 which form the upper inside portion of the door openings and cooperate with the structure, which will be later described, to form the upper portion of the door pillar.

The windshield opening, as illustrated, is provided of a shape to permit the use of a V-shaped windshield. At the inside of the windshield opening, an instrument panel 24 is formed extending inwardly and downwardly and being provided at the inside lower end with a rearwardly extending flange 25. Said flange is provided at each end with a down-turned extension 26 which is secured to a lower door pillar member 27. Said member overlaps the lower portion of the curved portions 23, being secured thereto by welding. A forwardly turned flange 28 on each member 27 provides for attachment of the extensions 26. A rearwardly bent portion 29 at the lower end of each member 27 provides means for attaching said member to a front sill member 30, as illustrated in Figures 2 and 3.

Figure 2:
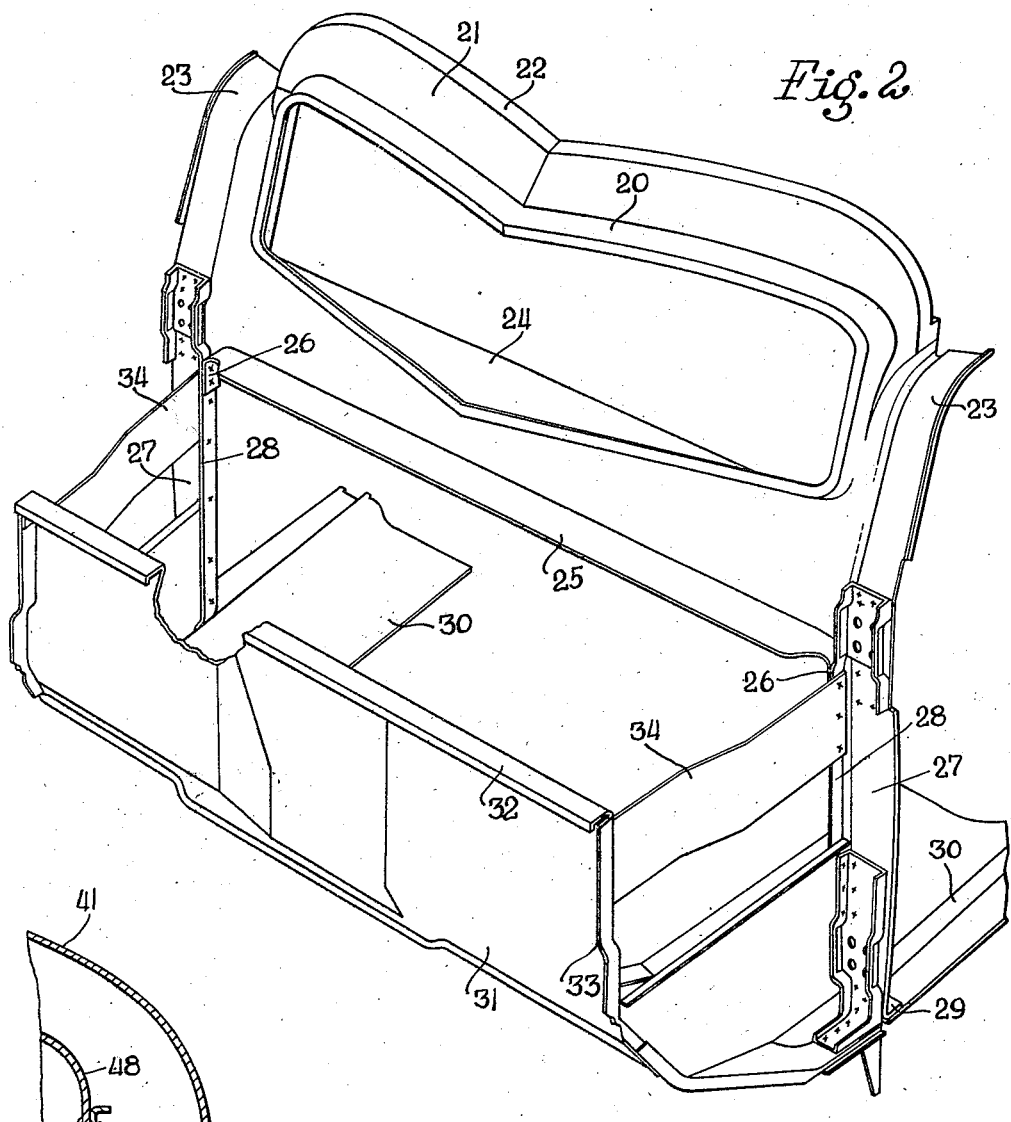
Figure 2 is a perspective view showing structure of Figure 1 with the dash section secured in position, and with the front frame sills secured to the dash portion.

Referring now to Figure 2, a substantial dash panel member 31 is provided with a forwardly extending flange 32 along its horizontal top portion and forwardly extending flanges 33 at its ends. Brace members 34 are secured to the flanges 28 of the door pillar members 27 and to the ends of the panel 31. As best shown in Figure 3, lower brace members 35 are secured to the flanges 28 and extend forwardly, being secured to the front dash panel 31 and to the front sill members 30. The front sill members 30 are also extended upwardly and are welded to the inside of the dash panel member 31 near its bottom end.

Figure 4 shows the front cowl section added to the structure of Figure 2. Said section is provided with a flange 36 mating with the flange 20 of the inside front section and secured thereto. Said cowl section also includes upright extensions 36' joining with the portions 23 to complete the upper box-like door pillars, as shown in Figure 9. Said figure also shows the windshield glass and securing means therefor and an outwardly opening channel 23' for a resilient door sealing member. At the front, the cowl section is turned downwardly and is joined to the upper portion of the front dash panel 31 along the flange 32.

At each side, a front side panel member 37 is joined to the member 27, to the horizontal end portions of the cowl member, and to the ends of the front dash panel.

Referring to Figure 5, the outside rear panel includes a rear outside back portion 38, forwardly curved corner or side portions 39, and a forwardly curved top portion 40. As shown, the top portion 40 is secured to a roof panel 41. Said panel is formed at the front opening with a flange 42 adapted to be secured to the top flange 20 above the windshield opening to complete the frame for the windshield. A rear opening 43 is formed in the upper portion of the back of the rear panel section.

Figure 10:
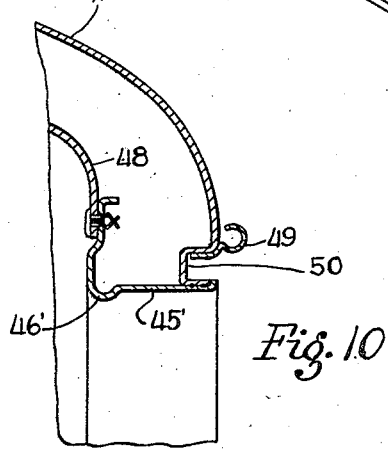
Figure 10 is a section taken on the line 10—10 of Figure 8.

The inner rear panel, as shown in Figure 6, is adapted to fit within the rear section in spaced relation to strengthen and reenforce the rear panel. Said panel consists of an upper portion 71 having a window opening 72 corresponding to the opening 43 in the outer rear panel and two downwardly extending side portions 73. Said portions are provided with vertical flanges 74 fitted in channels 75 formed in the outer rear panel, as best shown in Figure 14. A flange 76, formed along the lower edge of the upper portion 71, is fitted in and welded to the rear panel channel 77, as best shown in Figure 12. As shown in Figure 12, the inside rear panel section is provided with a flange 42' around the window opening to cooperate with the flange around the rear window opening 43 in the outer panel, said flanges being secured together by welding to provide means for mounting a rear window 44 by means of a resilient channel member 45. The inner rear panel section is also provided with out-turned flanges 46, as shown in Figure 14, adapted to mate with flanges 47 on the rear panel section, as shown in Figure 14, to provide a rear door pillar. The flanges 47 are the terminal edges of outwardly opening channels 47' provided for resilient door sealing members. The flanges 46 include a raised bead 46', which serves to improve interior appearance by reducing the apparent size of the clearance opening between door and cab. The flanges 47 also extend around the top wall to the joint between the rear section and the roof panel 41. As shown in Figures 7 and 10, an additional channel member 45' is secured along the roof panel to provide means for bracing the edge of the panel and to provide also a frame over the top of the door and a bracing means for the edge of the roof panel. Said member is also provided with a vertical flange for attaching an inner roof panel liner 48 of fibre board or other suitable material, as illustrated in Figure 10, and a windlass bead 46'. A drip moulding 49 is mounted in an outwardly opening channel 50 formed around the edge of the roof panel 41 for a resilient door-sealing member.

A seat box and rear bottom member 51 are formed with a raised portion 52 for supporting the seat cushion of the vehicle. Flanges are provided entirely around the seat box. As indicated in Figure 12, the forward flange 53 is provided with a ledge 54 for supporting floor boards. At the sides, flanges 55 are provided with a rib 56 for stiffening a vertical extension 57 and a horizontal extension 58. At its outer edge, the extension 58 has a short radius flange 59 bent downwardly to provide a concealed edge. A panel member 60, extending from the front of the cab to the rear section, extends below the bottom of the door. Said member has an inwardly bent upper portion 61 connected with a vertical portion 62 and a reversely bent flange 63. Said flange fits against the flange 58 closely adjacent the flange 59 forming a recess 64 in which sponge rubber or other resilient door-sealing material may be fitted. A reenforcing bead is formed along the bottom of the member 60 ending in an in-turned flange 65. It will be noted by inspection of Figures 8, 13, and 14 that the front side sill member 30 is the same shape in cross-section as the side of the seat box having flanges and walls corresponding to the parts 55, 56, 57, 58, and 59. The rear end of the front sill member 30 overlaps the same shaped section of the seat box and is secured first by welding, as indicated in Figure 11. It will be noted that the member 30 has a curved edge 65 on its horizontal portion which fits around the curved forward portion of a seat box 51. The lower edge of the sill 30 is secured to the flange 63 of the member 60 to form a continuation of the recess 64.

At the rear of the seat box, a wide horizontal portion 66 is provided with a down-turned flange 67 which is secured by welding to a mating flange 68 formed at the bottom edge rear portion 38 of the back panel. Around the rear corners of the seat box, as shown on the section of Figure 13, a down-turned flange 69 is secured by welding to the lower end portion 73 of the inner rear panel. A channel-shaped filler 70 is fitted between the adjacent corners of the inner and outer rear panels, as shown in Figure 13. This completes basically the joining of the principal elements which make up the cab. This rear construction constitutes one of the principal features of novelty of applicant's cab construction. It is to be understood that the complete details of every joint have not been shown, and it may be stated that it is customary to fill in joints where elements are closely adjacent with welding material where flanges are not provided.

By this construction as above set forth, applicant has simplified the construction of a cab, utilizing a minimum number of parts with maximum strength and eliminating many of the parts heretofore utilized in the construction of all-steel cabs.

It is to be understood that applicant claims as his invention all modifications in steel body construction falling within the scope of the appended claims.

What is claimed is:

1. A rear section construction for cabs for automotive vehicles comprising an outer rear panel including a back portion and integral side portions and an inner rear panel spaced from the outer panel, said inner panel having a horizontal flanged portion secured to an intermediate portion of the outer panel, spaced vertical flanged portions secured to the back portion of the outer panel adjacent the side portion and outwardly extending vertical flanges secured to the forward edges of the side portions of the outer panel to form door pillars.

2. A rear section construction for cabs for automotive vehicles comprising an outer rear panel including a back portion and integral side portions and an inner rear panel spaced from the outer panel, said inner panel having spaced vertical flanged portions secured to the back portion of the outer panel adjacent the side portions and outwardly extending vertical flanges secured to the forward edges of the side portions of the outer panel.

3. A rear section construction for cabs for automotive vehicles comprising an outer rear panel including a back portion and integral side portions, an inner rear panel spaced from the outer panel, said inner panel having a horizontal flanged portion secured to an intermediate portion of the outer panel, spaced vertical flanged portions secured to the back portion of the outer panel adjacent the side portions and outwardly extending vertical flanges secured to the forward edges of the side portions of the outer panel to form door pillars, and a bottom section having a flange at the rear secured to the bottom of the outer panel and side flanges secured to the lower end portion of side portions of the inner panel.

4. A rear section construction for cabs for automotive vehicles comprising an outer rear panel including a back portion having a window opening surrounded by an in-turned flange and integral side portions, an inner rear panel spaced from the outer panel and having a window opening surrounded by an out-turned flange secured to the window opening flange on the outer panel, said inner panel having a horizontal flanged portion secured to an intermediate portion of the outer panel, spaced vertical flanged portions secured to the back portion of the outer panel adjacent the side portions and outwardly extending flanges secured to the forward edges of the side portions of the outer panel to form door pillars.

5. A rear section construction for cabs for automotive vehicles comprising an outer panel including a back portion and integral side portions, said back portion having a horizontal channel formed at an intermediate point and vertical channels connecting the horizontal channel near the side portions of the panel and an inner rear panel spaced from the outer panel, said inner panel having flanged portions abutting said channel portions and secured thereto by welding and outwardly extending flanges secured to the forward edges of the outer panel to form door pillars.

6. A rear section construction for cabs for automotive vehicles comprising an outer sheet metal panel having a back portion and side portions joined to the back by integral curved corner portions, said side portions having flanges at their vertical edges along door openings, and an inner rear panel having an upper portion spaced from the outer panel and downwardly extending side portions spaced from the side portion of the outer panel, said side portions each having a forwardly projecting bead to provide a wind obstruction along the door opening and an outwardly extending flange secured by welding to the corresponding flange on the outer panel.

7. A rear section construction for cabs for automotive vehicles comprising an outer sheet metal panel having a back portion and side portions joined to the back by integral curved corner portions, said side portions having at their vertical edges an outwardly opening channel-shaped flange to form receiving means for door-sealing material, and an inner rear panel having an upper portion spaced from the outer panel and downwardly extending side portions spaced from the side portion of the outer panel, said side portions each having an outwardly extending flange secured by welding to the outwardly directed portion of the channel-shaped flange on the outer panel.

8. A rear section construction for cabs for automotive vehicles comprising an outer sheet metal panel having a back portion and side portions joined to the back by integral curved corner portions, said side portions having at their vertical edges outwardly opening channel-shaped flanges to form receiving means for door-sealing material, and an inner rear panel having an upper portion spaced from the outer panel and downwardly extending side portions spaced from the side portion of the outer panel, said side portions each having a forwardly projecting bead to provide a wind obstruction along the door opening and an outwardly extending flange secured by welding to the outwardly directed portion of the channel-shaped flange on the outer panel.

9. A rear section construction for cabs for automotice vehicles comprising an outer panel including a back portion and integral side portions, said back portion having a horizontal channel formed at an intermediate point and vertical channels connecting the horizontal channel near the side portions of the panel, and an inner rear panel having an upper portion and depending side portions spaced from the outer panel, the upper portion of said inner panel having a flanged portion abutting said horizontal channel and secured thereto and the depending side portions having flanges secured to the vertical channels and to the forward edges of the outer panel to form door pillars.

10. A rear section construction for cabs for automotive vehicles comprising an outer rear panel including a back portion and opposite, transversely spaced side portions; and an inner rear panel disposed in a plane spaced forwardly from the outer panel and having its transversely opposite edges respectively spaced transversely inwardly of the forward edges of the side panels; means including a flanged portion secured between the inner panel and the back portion of the outer panel; means including transversely spaced flanged portions secured respectively between the inner panel and the back portion of the outer panel adjacent the side portion; and means including opposite, outwardly extending vertical flanges secured respectively between the aforesaid opposite edges of the inner panel and the forward edges of the side portions of the outer panel to form door pillars.

11. A rear section construction for cabs for automotive vehicles comprising an outer rear panel including a back portion and side portions, an inner rear panel spaced from the outer panel, means providing spaced vertical flanged portions secured between the inner panel and the back portion of the outer panel adjacent the side portions of the latter, and means providing outwardly extending vertical flanges secured between the inner panel and the forward edges of the side portions of the outer panel.

12. A rear section construction for cabs for automotive vehicles comprising an outer rear panel including a back portion and side portions, an inner rear panel spaced from the outer panel, said inner panel having a flanged portion secured to an intermediate portion of the outer panel, spaced vertical flanged portions secured to the back portion of the outer panel adjacent the side portions and outwardly extending vertical flanges secured to the forward edges of the side portions of the outer panel to form door pillars, and a bottom section having a flange secured to the outer panel and side flanges secured to portions of the inner panel.

13. A rear section construction for cabs for automotive vehicles comprising an outer rear panel including a back portion having a window opening surrounded by a flanged portion, and side portions; an inner rear panel spaced from the outer panel and having a window opening surrounded by a flanged portion complementary to the window opening flanged portion on the outer panel and secured thereto; said inner panel having a second flanged portion secured to a portion of the outer panel at a point spaced from the window opening, spaced vertical flanged portions secured to the back portion of the outer panel adjacent the side portions, and flanges secured to the forward edges of the side portions of the outer panel to form door pillars.

DONALD G. RENNO.